US006866861B1

United States Patent
Luhman

(10) Patent No.: US 6,866,861 B1
(45) Date of Patent: Mar. 15, 2005

(54) METHOD AND COMPOSITION FOR ENHANCING MILK COMPONENT CONCENTRATIONS

(75) Inventor: Cindie M. Luhman, Jewell, IA (US)

(73) Assignee: Land O'Lakes, Inc., Arden Hills, MI (US)

(*) Notice: Subject to any disclaimer, the term of this patent is extended or adjusted under 35 U.S.C. 154(b) by 0 days.

(21) Appl. No.: 09/239,873

(22) Filed: Jan. 29, 1999

(51) Int. Cl.⁷ ............................................. A23K 1/18
(52) U.S. Cl. ........................... 424/438; 426/2; 426/53; 426/807; 514/738
(58) Field of Search ..................... 426/103, 2, 53, 426/807; 424/438; 514/738

(56) References Cited

U.S. PATENT DOCUMENTS

| | | | |
|---|---|---|---|
| 3,338,718 A | 8/1967 | Olson et al. | 99/2 |
| 3,959,493 A | 5/1976 | Baalsrud et al. | 426/2 |
| 4,127,676 A | 11/1978 | Merensalmi | 426/2 |
| 4,181,709 A | 1/1980 | Dannelly | 424/21 |
| 4,735,735 A | 4/1988 | Donovan et al. | 426/69 |
| 4,735,809 A | 4/1988 | Donovan et al. | 426/69 |
| 5,137,735 A | 8/1992 | Bignon | 426/2 |
| 5,145,695 A | 9/1992 | Smith et al. | 426/2 |
| 5,190,775 A | 3/1993 | Klose | 426/2 |
| 5,252,561 A | 10/1993 | Hornykiewytsch et al. | 514/23 |
| 5,380,525 A | 1/1995 | Leedle et al. | 424/93.4 |
| 5,474,785 A | 12/1995 | Wright et al. | 424/473 |
| 5,496,571 A | 3/1996 | Blagdon et al. | 426/2 |
| 5,503,112 A | 4/1996 | Luhman et al. | 119/174 |
| 5,518,730 A | 5/1996 | Fuisz | 424/426 |
| 5,585,134 A | 12/1996 | Cummings et al. | 426/630 |
| 5,660,852 A | 8/1997 | McKeown et al. | 424/438 |
| 5,707,617 A | 1/1998 | Conrad et al. | 424/93.1 |
| 5,741,506 A | 4/1998 | Bauchart et al. | 424/439 |
| 5,807,594 A | 9/1998 | King et al. | 426/2 |

FOREIGN PATENT DOCUMENTS

| | | |
|---|---|---|
| CA | 600707 | 6/1960 |
| CA | 645019 | 7/1962 |
| GB | 838766 | 6/1960 |
| GB | 2159690 A | 12/1985 |

OTHER PUBLICATIONS

Makinen et al MTR Reprint 23(6) p. 1077–1087, '81.*
Khalili et al Agri. & Food Science in Finland vol. 6; pp. 349–362, '97.*
Ramond et al Repro. Nutr. Develop. Effet de L'addition de Sorbitol 26(1B) pp. 365–366, 86.*
Ramond et al Effects of Feeding Sorbitol Reprod. Mtr Dev. 26 (1 Part B) pp. 365–366, '86.*
Makinen et al A Polyol Mixture of Dairy Nut Rep. Int 23(6) pp. 1077–1088, 1981.*
Khalili et al Agric. Food Sci. Finl. 6(5–6) pp. 349–362, 1997.*
Sauer, F.D., Erfle, J.D., Fisher, L.J.; *Propylene Glycol and Glycerol As A Feed Additive For Lactating Dairy Cows: An Evaluation of Blood Metabolite Parameters;* Canadian Journal of Animal Science; vol. 53, pp 265–271 (1973).

(List continued on next page.)

*Primary Examiner*—Neil S. Levy
(74) *Attorney, Agent, or Firm*—Westman, Champlin & Kelly, P.A.

(57) ABSTRACT

A method of enhancing milk component production in a ruminant, the method including providing a feed that includes a sugar alcohol and supplying the sugar alcohol to the abomasum of the ruminant.

97 Claims, 3 Drawing Sheets

Average Total Solids Concentration (Wt %) Versus Time
For Milk Produced By Two Cows During a 9 Week Trial Period week 0=inital point
week 1-3=glycerol
week 4-6=water
week 7-9=glycerol

OTHER PUBLICATIONS

Fisher, L.J., Erfle, J.D., Lodge, G.A.; Sauer, F.D.; *Effects of Propylene Glycol or Glycerol Supplementation Of the Diet Of Dairy Cows On Feed Intake, Milk Yield and Composition, and Incidence of Ketosis;* Canadian Journal of Animal Science; vol. 53; pp 289–296 (1973).

Lister, Cliff J. & Smithard, Ronald R., "Effects of Intraruminal Administration of Polyol to Sheep," vol. 35, pp. 21–28 (J. Sci. Food Agric.) 1984.

H. Khalili; Agricultural and Food Science in Finland; vol. 6; The effects of added glycerol or unprotected free fatty acids or a combination of the two on silage intake, milk production, rumen fermentation and diet digestability in cows given grass silage based diets; May 1997; pp. 349–362.

Abstract of Article entitled: "Abomasal Infusion of Glucose and Fat–Effect on Digestion, Production, and Ovarian and Uterine Functions of Cows", from *80:1315–1328 of 1997 J. Dairy Sci; Abstract* published at http:/www.aces.uiuc.edu/~gregm/adsa/jds/abs/97/Jul97/ab1315.html and dated Jul., 1997.

Jai–Jun Choung & David Chamberlain, "The Effects of Abomasal Infusions of Casein or Soy–Bean–Protein Isolate on the Milk Production of Dairy Cows in Mid–Lactation," pp. 103–115 (British Journal of Nutrition) 1993.

L. Istasse & E.R. Orskov, "The Effects of Abomasal Infusions of Casein or Glucose on Milk Yield and on Some Blood Constituents of Diary Cows in Early and Late Lactation," pp. 538–539 (Journal of British Society of Animal Production).

J.D. Oldham & J.A. Bines, "Milk Production in Cows Infused Abomasally with Casein, Glucose or Aspartic and Glutamic Acids Early in Lactation," p. 65A (Proceedings of the Nutrition Society) vol. 43, 1984.

B.S. Oldick, C.R. Staples, W.W. Thatcher and P. Gyawu, The Abstract of "Abomasal Infusion of Glucose and Fat–Effect on Digestion, Production, and Ovarian and Uterine Functions of Cows," p.1 (1997 J. Dairy Sci. 80:1315–1328, www.aces.uiuc.edu/~gregm/adsa/jds/toc/97/Jul97ab1315.html.

* cited by examiner

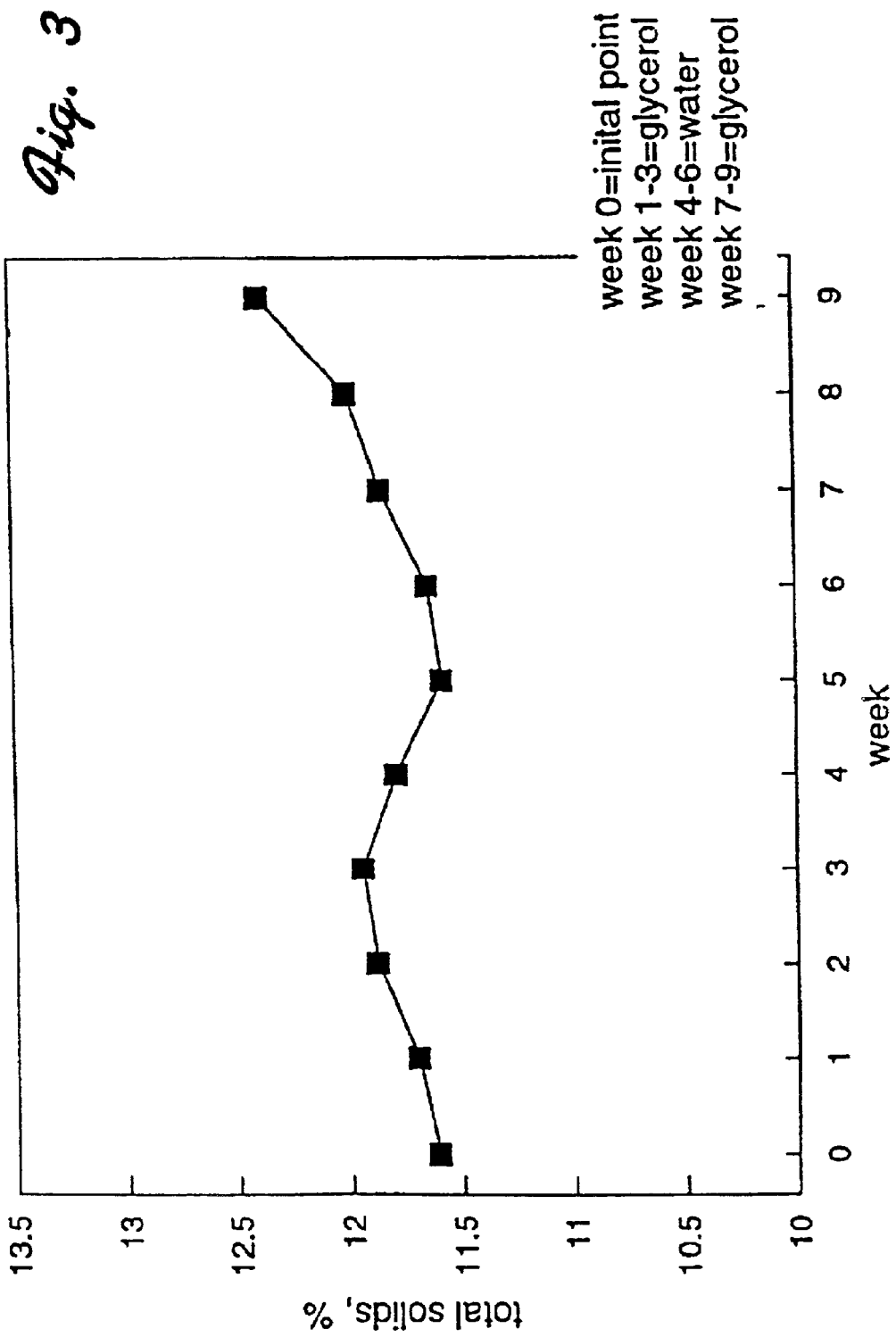

METHOD AND COMPOSITION FOR ENHANCING MILK COMPONENT CONCENTRATIONS

BACKGROUND OF THE INVENTION

The present invention generally relates to a method and composition for enhancing milk component production in ruminants. More particularly, the present invention relates to a method and composition for enhancing the solids content of milk produced by ruminants.

Milk producers are interested in selectively increasing the solids content of milk produced by ruminants to incrementally add value to ruminant-produced milk. Manufacturers of dairy products value milk having a higher solids content because such milk increases the yield of products made from the milk and components of the milk. Indeed, both in the United States and in many foreign countries, milk producers are paid for the milk on a graded scale based upon the amount of fat, protein, or other measures of solids that are contained in the milk.

It is well known that the composition of milk for lactating dairy cows can be changed by judicious feeding of different feeds or feed additives. For example, nutritionists have known for years that promoting a low acetate:propionate ratio in the volatile fatty acids processed in the rumen of dairy cows causes a significant decrease in the percentage of milk fat as well as a minor increase in the percentage of milk protein. This scheme, however, can cause health problems in dairy cows that consume such a ration over extended periods of time, including ruminal keratosis, displacement of the abomasum, and laminitis. Another effort focused on increasing milk component concentration, specifically milk protein concentration, in ruminant-produced milk and relied upon the feeding of rumen inert amino acids, especially methionine and lysine.

While these additional ruminant feeding techniques have enhanced the overall knowledge base with respect to ruminant feeding, these techniques have not adequately addressed the problem of how to most economically, efficiently, and effectively increase the concentration of milk components in ruminant-produced milk. Therefore, a need still exists for an improved method and composition for feeding a ruminant that enhances the concentration of milk components in the ruminant-produced milk.

BRIEF SUMMARY OF THE INVENTION

The present invention includes a method of enhancing milk component production in a ruminant. This method includes providing a feed that includes a sugar alcohol and supplying the sugar alcohol to the abomasum of the ruminant. The present invention further includes a method of feeding a ruminant, a method of producing feed for a ruminant, and a feed material that is effective to enhance milk component production in a ruminant when the feed material is supplied to the ruminant

BRIEF DESCRIPTION OF THE DRAWINGS

FIG. 3 is a graph of the concentration of total solids in milk versus time when abomasally infusing glycerol into cattle in accordance with the method of the present invention.

DETAILED DESCRIPTION

Figure 1:
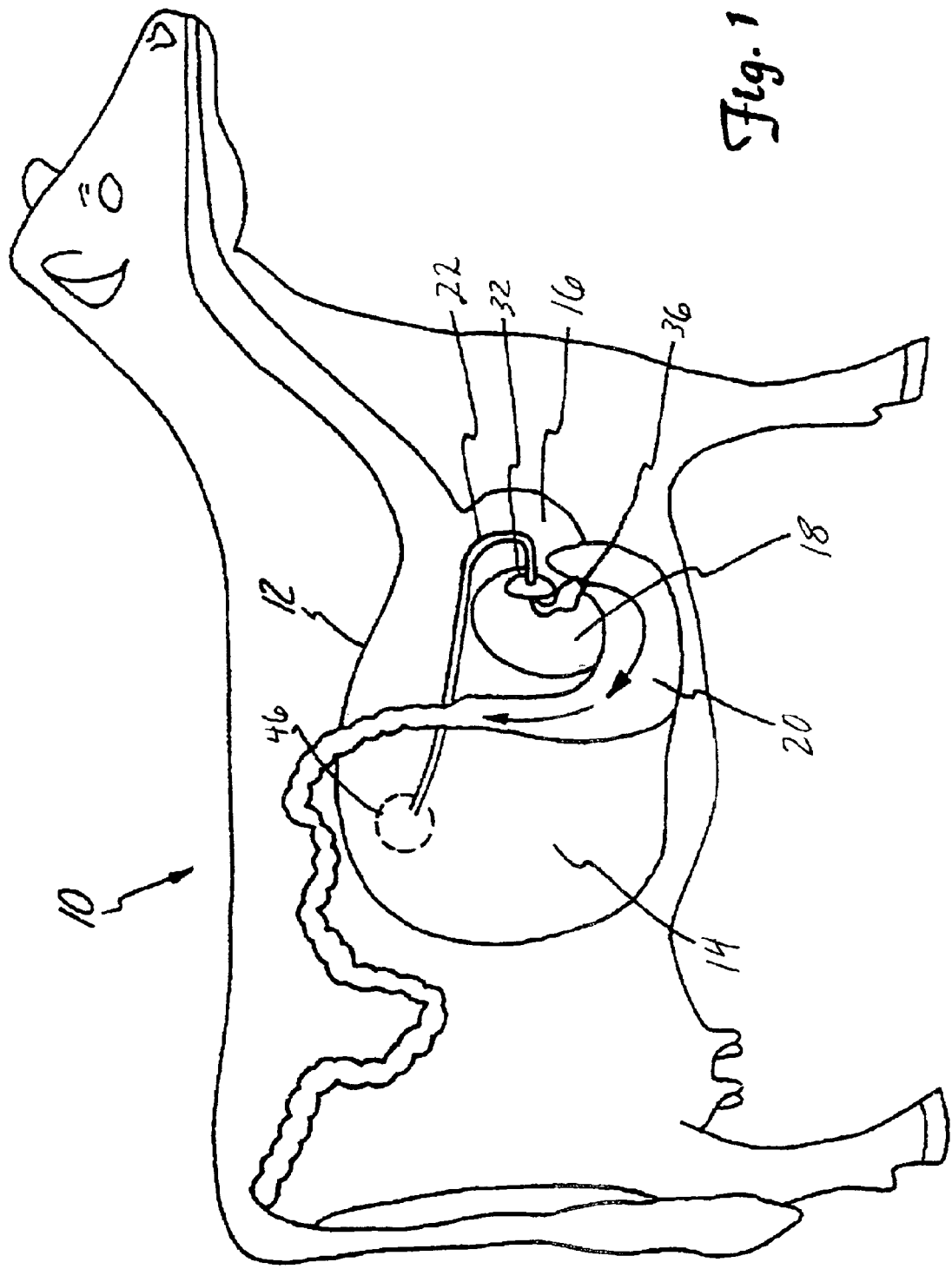
FIG. 1 is a diagram of a cow equipped with a device for practicing the method of the present invention.

The present invention includes both a method and a feed composition for enhancing the concentration of milk components, such as fat, true protein, lactose, and total solids, in milk produced by ruminants. The method of the present invention entails feeding ruminants the feed composition that includes at least a sugar alcohol component, where the sugar alcohol component is either (1) introduced directly into the abomasum of the ruminant or (2) is protected from alteration by the rumen and is orally fed to the ruminant.

It has been discovered that if a sugar alcohol is introduced directly in the abomasum of a ruminant, the total solids content of milk produced by the ruminant is typically increased. Additionally, this direct introduction of sugar alcohol into the abomasum also causes the weight percent of fat, the weight percent of true protein, and/or the weight percent of lactose in the milk to increase. For example, when abomasally infusing sugar alcohols, such as sorbitol, xylitol, and glycerol, the solids content of milk produced by the ruminant, particularly the fat content and the true protein content of the milk, typically increases. It has also been found that feeding these same sugar alcohols orally to the ruminant, without protecting the sugar alcohol from alteration in the rumen of the ruminant, results in no increase in the total solids content, the fat content, the true protein content, or the lactose content of the milk produced by the ruminant.

As used herein, sugar alcohol is defined as a polyhydric alcohol formed by the reduction of the carbonyl group of a sugar to a hydroxyl group, with no more than one hydroxy group being attached to any one carbon atom of the sugar alcohol. Three preferred examples of sugar alcohols that may be used in practicing the present invention include sorbitol, xylitol, and glycerol. Some additional non-exhaustive examples of other sugar alcohols that may be used in practicing the present invention include adonitol; allitol; altritol (D-altritol, L-altritol, and D,L altritol); arabinitol (D-arabinitol, L-arabinitol, and D,L arabinitol); dulcitol (a.k.a galactitol); erythritol; galaxitol; glucitol (D-glucitol, L-glucitol, and D,L glucitol); iditol (D-iditol and. L-iditol); inositol; isomalt; lactitol; maltitol; mannitol (D-mannitol, L-mannitol, and D,L mannitol); perseitol; ribitol; rhamnitol; and threitol (D-threitol, L-threitol, and D,L threitol). These sugar alcohols may be provided individually or in any combination to the ruminant.

As used herein, the term "ruminant" means an even-toed hoofed animal which has a complex three- or four-chambered stomach and which typically rechews what it has previously swallowed. Some non-exhaustive examples of ruminants include cattle, sheep, goats, oxen, musk ox, llamas, alpacas, guanicos, deer, bison, antelopes, camels and giraffes.

In practicing the present invention to achieve enhanced milk component content in milk produced by ruminants, the sugar alcohol may be infused, individually or as part of a food composition, into the abomasum of the ruminant. In addition to the sugar alcohol, the food composition that is abomasally infused may include any other conventional ruminant feed component that is capable of being blended with the sugar alcohol and abomasally infused as part of the feed composition into the ruminant, so long as the additional components do not hinder functioning of the abomasum or the intestines and are not otherwise harmful to the ruminant. Some non-exhaustive examples of such feed components that could be abomasally infused as part of the feed composition along with the sugar alcohol include water, bean or grain-based oils, meals, or syrups; fatty acids, amino acids, and mixtures thereof.

As an alternative to infusing sugar alcohol into the abomasum of the ruminant, the sugar alcohol could be included as a component of feed that is orally fed to the ruminant. When this approach is taken, it is necessary that the orally-introduced feed composition, or at least the sugar alcohol component of the orally-introduced feed composition, be treated or otherwise prepared to render the sugar alcohol ruminally-protected. As used herein, the term "ruminally-protected" means protected from alternation during passage through the rumen.

When the sugar alcohol is included as a component of the feed that is orally fed to the ruminant in accordance with the present invention, the sugar alcohol should at least be ruminally-protected to a degree sufficient to prevent significant alteration of the sugar alcohol in the rumen such that at least about 50 weight percent of the sugar alcohol orally ingested by the ruminant arrives unaltered, as sugar alcohol, in the abomasum of the ruminant after passing through the rumen of the ruminant. Preferably, the sugar alcohol that is included as part of the orally ingested feed composition is ruminally-protected to a degree sufficient to allow at least about 75 weight percent of the orally-ingested sugar alcohol to arrive unaltered, as sugar alcohol, in the abomasum of the ruminant. Still more preferably, the sugar alcohol that is induced as part of the orally-ingested feed composition is ruminally-protected to a degree sufficient to allow at least about 90 weight percent of the orally-ingested sugar alcohol to arrive unaltered, as sugar alcohol, in the abomasum of the ruminant. Most preferably, the sugar alcohol that is included as part of the orally-ingested feed composition is ruminally-protected to a degree sufficient to allow all, or essentially all, of the orally-ingested sugar alcohol to arrive unaltered, as sugar alcohol, in the abomasum of the ruminant.

For purposes of gauging the degree to which a particular sugar alcohol component of a particular feed is ruminally protected, a technique that is a standard method of the dairy industry may be employed. This technique is an in situ method wherein feed containing the particular sugar alcohol of interest is suspended in a polyester fiber bag in the rumen of a ruminant. The polyester fiber bag is periodically retrieved from the rumen of the ruminant and tested to determine the change, if any, in the quantity of the particular sugar alcohol in question over time, taking into account any loss of sugar alcohol particles or granules through the pores of the polyester fiber bag. The polyester fiber of one suitable polyester fiber bag is made of a condensation polymer that is distributed under the trademark DACRON and that is obtained from ethylene glycol and terephthalic acid.

Suitable test methods for determining the weight of a particular sugar alcohol present in the DACRON polyester fiber bag at any particular time may be found in the third edition of *Food Chemical Codex*, which was published in 1988 by National Academy Press of Washington, D.C. and edited by the Committee on Codex Specifications of Food and Nutrition Board of the Institute of Medicine. For example, the weight of glycerol in the DACRON polyester fiber bag at any particular time may be determined in accordance with the Assay procedure for glycerol that is found on pages 136–137 of the third edition of *Food Chemical Codex*. Also, the weight of sorbitol in the DACRON polyester fiber bag at any particular time may be determined in accordance with the Assay procedure for sorbitol that is found on pages 308–309 of the third edition of *Food Chemical Codex*. Furthermore, the weight of xylitol in the DACRON polyester fiber bag at any particular time may be determined in accordance with the Assay procedure for xylitol that is found on pages 348–349 of the third edition of *Food Chemical Codex*.

When using this technique, the DACRON polyester fiber bag should have a pore size that permits passage of bacteria from the rumen and into the DACRON polyester fiber bag, while not allowing feed particles larger than the bacteria to escape from the bag and into the rumen. The feed is preferably formulated to assure that the physical form of the sugar alcohol, such as sugar alcohol particles or granules, is larger than the pore size of the DACRON polyester fiber bag to minimize any loss of sugar alcohol particles or granules through the pores of the DACRON polyester fiber bag. If this step is not taken, the technique will need to include a factor to account for loss of sugar alcohol particles or granules through the pores of the DACRON polyester fiber bag, as opposed to degradation of sugar alcohol by bacteria within the DACRON polyester fiber bag.

The feed composition that is orally fed to the ruminant may be prepared by any conventional method that is capable of rendering the sugar alcohol ruminally-protected. Numerous U.S. patents disclose suitable methods for rendering the sugar alcohol of orally ingested feed ruminally-protected. For example, U.S. Pat. Nos. 3,959,493; 4,181,709; 5,190,775; 5,496,571; 5,518,730; 5,660,852; 5,741,506; and 5,807,594, among others, each disclose suitable methods for rendering the sugar alcohol of orally ingested feed ruminally-protected. Consequently, U.S. Pat. Nos. 3,959,493; 4,181,709; 5,190,775; 5,496,571; 5,518,730; 5,660,852; 5,741,506; and 5,807,594 are each incorporated by reference.

When practicing the method of the present invention of orally feeding the feed composition that includes the sugar alcohol to the ruminant, the orally introduced feed composition, in addition to the sugar alcohol, may also include any other conventionally used feed components, so long as the sugar alcohol component of the feed composition is ruminally-protected. Non-exhaustive examples of other components of the orally introduced food composition in addition to the sugar alcohol include, but are not limited to, grains, such as oats, barley, corn, wheat and soybeans; meal, oil, and/or syrup based upon any of these grains; alfalfa; legume hay, grass hay, corn silage; legume silage; grass silage; fatty and amino acids; and flavor enhancers, such as anise.

As described above, the feed composition that includes ruminally-protected sugar alcohol may be orally fed to the ruminant as part of the ruminant's daily ration. When this course is taken, it is critical that the sugar alcohol be protected from alteration in the rumen. If this step of protecting the sugar alcohol from alteration in the rumen is not taken, orally ingested sugar alcohol will not cause any enhancement of milk components in milk produced by the ruminant ingesting the sugar alcohol, as exemplified in Examples 6 and 7 below. The sugar alcohol component of any feed provided orally to the ruminant must be protected from alteration in the rumen of the ruminant in order to realize the beneficial increase in milk component concentrations in accordance with the present invention.

Alternatively, feed that either consists of or includes sugar alcohol, where the sugar alcohol does not need to be ruminally-protected, may be infused directly into the abomasum, without allowing the sugar alcohol to pass through the rumen or other portions of the ruminant stomach occurring prior to the abomasum. By way of review, as best depicted in FIG. 1, the digestive tract of a cow 10 includes a stomach 12 that has four sections: (1) a rumen 14, (2) a reticulum 16, (3) an omasum 18, and (4) an abomasum 20. The four sections of the stomach 12 can affect digestion of a component passing through the stomach 12 because each section of the stomach serves a different function in the digestive process. In the rumen 14, food is mixed with saliva and then churned in a coordinated motion. The food mixture undergoes some fermentation and bacterial digestion in the rumen 14. The mixture of food and saliva then passes to the reticulum 16 where the mixture is formed into a cud that can be regurgitated. After thorough chewing of the regurgitated cud, the cud is reswallowed and then passes from the rumen 14 through the reticulum 16 and into the omasum 18, if particle size restrictions are satisfied. While in the omasum 18, the mixture is additionally mixed to maintain it in a homogeneous state and to remove excess fluid. Then the homogeneous mixture is passed from the omasum 18 to the abomasum 20 where gastric digestion occurs.

Figure 2:
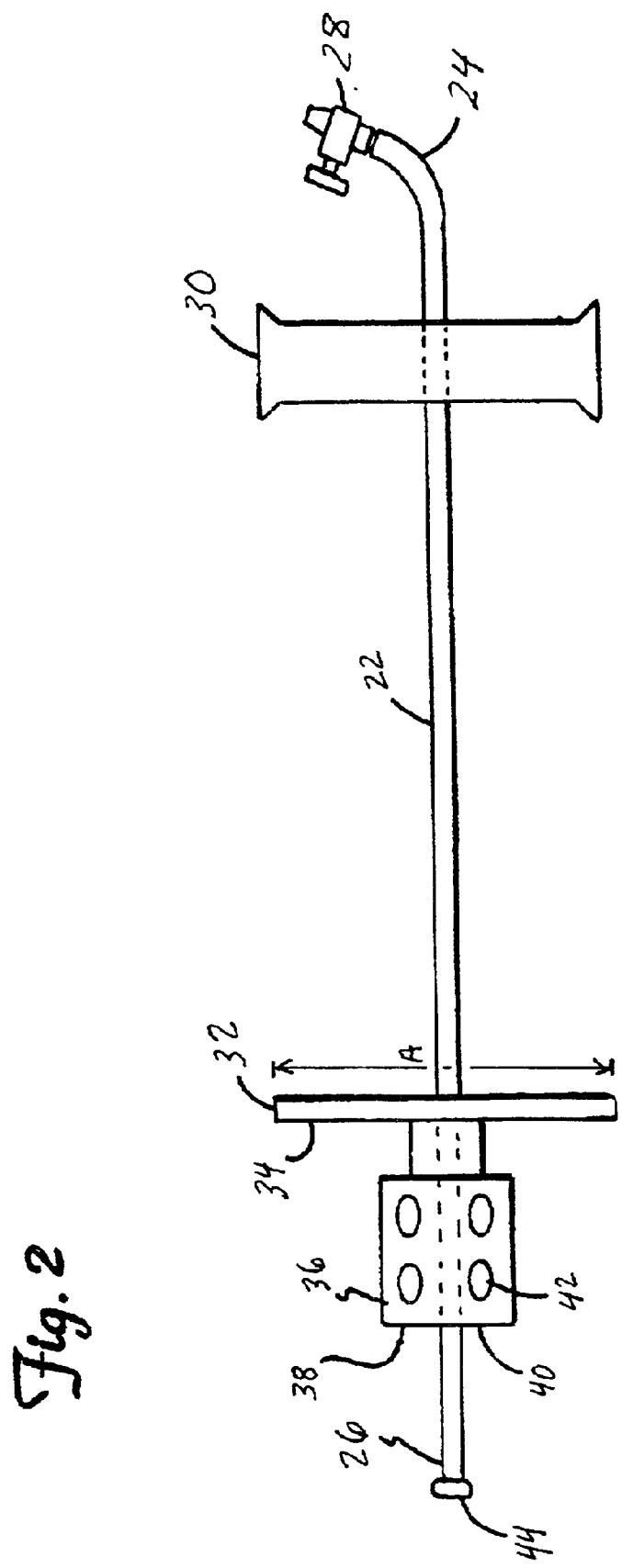
FIG. 2 is a diagram of a device for use in practicing the method of the present invention.

Any conventional technique and apparatus for introducing the feed consisting of or including sugar alcohol directly into the abomasum while bypassing the rumen 14, the reticulum 16, and the omasum 18 may be incorporated to achieve the results of the present invention. One particular technique that has been successfully employed relies upon an abomasal infusion tube 22 that is inserted in the abomasum 20 of the cow 10. The abomasal infusion tube 22 that maybe used in accordance with the method of the present invention has an input end 24 and an output end 26, as best illustrated in FIG. 2. The abomasal infusion tube 22 is preferably between about 4 and about 8 feet long and has a diameter ranging between about ¼ inch and about 1 inch.

A stopcock 28 is affixed to the input end 24 of the abomasal infusion tube 22. The stopcock 28 permits closure of the tube 22. The rate of infusion through the tube 22 may be controlled by connecting the tube 22 to an appropriate pump system. When the stopcock 28 is closed, the stopcock 28 prevents undesirable materials, such as dirt, bacteria, and other foreign materials, from entering the abomasum 20 and also may serve to prevent leakage of any abomasal contents entering the tube 22 from escaping the tube 22.

A rumen cannula plug 30 is attached to the abomasal infusion tube 22 about eight inches from the input end 24. Preferably, a rubber flange 32 is attached to the abomasal infusion tube 22 approximately seven inches from the output end 26. The flange 32 has a first major surface 34 that is oriented toward the output end 26. Additionally, the flange 32 has a diameter A that is greater than the diameter of the junction between the reticulum 16 and the omasum 18. The flange 32 thereby retains the abomasal infusion tube 22 in the abomasum 20.

Preferably, a spacer, such as a 60 milliliter bottle 36, is retained adjacent to the first major surface 34 between the flange 32 and the output end 26. The spacer, such as the bottle 36, prevents the output end 26 from laying against a side of the abomasum 20. An end 38 of the bottle 36 opposite the first major surface 34 may have an opening 40. In addition, the bottle 36 may also have a plurality of apertures 42. If included, the opening 40 and the apertures 42 permit material in the omasum 18 and the abomasum 20 to flow through the bottle 36.

A flap valve 44 may optionally be attached to the output end 26. The flap valve 44 opens to permit infusion fluid to pass from the abomasal infusion tube 22 and into the abomasum 20. Additionally, the flap valve 44 prevents material in the abomasum 20 from flowing into the abomasal infusion tube 22.

Returning to FIG. 1, prior to inserting the infusion tube 22 into the cow 10, the cow is surgically-fitted with a rumen cannula 46. Fitting of the rumen cannula 46 in ruminants, such as cows, is well known in the art. The abomasal infusion tube 22 is inserted through the rumen cannula 46. The output end 26 of the abomasal infusion tube 22 is then fed through the rumen cannula 46 and into the rumen 14. The output end 28 is then fed through the reticulum 16 and the omasum 18 and toward the abomasum 20. While directing the output end 26 in the abomasum 20, care must be exercised to avoid damaging the wall of the stomach 12.

When inserting the flange 32 into the omasum 18, the flange 32 is deformed to closely confront the bottle 36. The flange 32 and the bottle 36 are then fed through the junction between the reticulum 16 and omasum 18 and the opening 40 of the bottle 36 is placed in communication with the abomasum 20. Once in the omasum 18, the flange 32 is permitted to relax and return to an undeformed configuration. Because the flange 32 is larger than the junction between the reticulum 16 and the omasum 18, the flange 32 is retained in the omasum 18 and the end 26 is retained in the abomasum 20.

After positioning the output end 26 in the abomasum 20, the rumen cannula plug 30 provides a seal against the rumen cannula 46 and thereby prevents undesired substances, such as dirt, bacteria, and other foreign matter, from entering the rumen 14 and also prevents leakage of rumen contents outside of the cow 10.

The abomasal infusion tube 22 permits the feed composition to be infused directly into the abomasum 20 without undergoing the alteration that typically occurs in the rumen 14. Therefore, when the abomasal infusion tube 22 is employed, the sugar alcohol component of the feed composition need not be ruminally-protected, since the sugar alcohol is placed directly into the abomasum 20 via the infusion tube 22 and therefore is not subject to the fermentation and bacterial digestion conditions of the rumen 14. However, by way of review, when the feed composition is orally administered to the ruminant, it remains necessary to ruminally protect the sugar alcohol component of the feed composition.

The sugar alcohol, whether fed orally or abomasally to the ruminant, may be fed, in combination with any other feed components, at any rate that supplies adequate nutrition. However, to realize significant benefits of the method of the present invention, the ruminant is preferably fed at least about 50 grams of sugar alcohol per day and more preferably at least about 100 grams of sugar alcohol per day.

Various analytical techniques are employed herein. An explanation of these techniques follows. All values presented in this document for a particular parameter, such as weight percent true protein, weight percent fat, weight percent lactose, weight percent non-protein nitrogen, weight percent ash, and weight percent total solids, are based on the "as is" sample and are therefore on a "Wet basis", unless otherwise specified herein.

Property Determination and Characterization Techniques

To determine the weight percent total solids, wet basis, in a sample, the actual weight of total solids is determined by analyzing the sample in accordance with Method #925.23 (33.2.09) of *Official Methods of Analysis*, Association of Official Analytical Chemists (AOAC) (16th Ed., 1995). The weight percent total solids, wet basis, is then calculated by dividing the actual weight of total solids by the actual weight of the sample.

To determine the percent of total protein, wet basis, in a sample, the actual weight of total protein is determined in accordance with Method #991.20 (33.2.11) of *Official Methods of Analysis*, Association of Official Analytical Chemists (AOAC)(16th Ed., 1995). The value determined by the above method yields "total Kjeldahl nitrogen," which is equivalent to "total protein" since the above method incorporates a factor that accounts for the average amount of nitrogen in protein. Since any and all total Kjeldahl nitrogen determinations presented herein are based on the above method, the terms "total Kjeldahl nitrogen" and "total protein" are used interchangeably herein. Furthermore, those skilled in the art will recognize that the term "total Kjeldahl nitrogen" is generally used in the art to mean "total protein" with the understanding that the factor has been applied. The weight percent total protein, wet basis, is calculated by dividing the actual weight of total protein by the actual weight of the sample.

The weight percent of true protein, wet basis, for a particular sample is calculated after first determining the wet basis weight percent of total Kjeldahl nitrogen and the wet basis weight percent of non-protein nitrogen in the sample. The wet basis weight percent of total Kjeldahl nitrogen in the sample is determined using the method referenced above. The wet basis weight percent of non-protein nitrogen (NPN) in the sample is determined in accordance with Method #991.21 (33.2.12) of *Official Methods of Analysis*, Association of Official Analytical Chemists (AOAC) (16th Ed., 1995). The weight percent of true protein, wet basis, in the sample is then determined by subtracting the wet basis weight percent of non-protein nitrogen in the sample from the wet basis weight percent of total Kjeldahl nitrogen in the sample.

To determine the weight percent lactose, wet basis, in a liquid sample, the weight of the liquid sample is first determined. The actual weight of lactose in the liquid sample may then be determined using analysis kit number 176–303, that is available from Boehringer-Mannheim of Indianapolis, Ind. in accordance with the procedural instructions included with analysis kit number 176–303. The weight percent lactose, wet basis, in the liquid sample is then calculated by dividing the actual weight of lactose in the liquid sample by the actual weight of the liquid sample.

To determine the weight percent fat, wet basis, in a sample, the actual weight of fat in the sample is determined in accordance with Method #974.09 (33.7.18) of *Official Methods of Analysis*, Association of Official Analytical Chemists (AOAC) (16th Ed., 1995). The weight percent fat, wet basis, is then calculated by dividing the actual weight of fat in the sample by the actual weight of the sample.

The present invention is more particularly described in the following examples which are intended as illustrations only since numerous modifications and variations within the scope of the present invention will be apparent to those skilled in the art.

EXAMPLE 1

In this example, xylitol was abomasally infused into three different cows at a rate of 100 grams per cow per day during a 14 day test period. The rations provided to the cows during the period extending from day 0, prior to abomasal infusion of xylitol, through day 14 of the test period were the same. The only difference in feeding of the cows between day 0 and days 1–14 of the test period were that during days 1–14 the cows were abomasally infused with the dosage of 100 grams of xylitol per cow per day.

The xylitol rations were mixed with water in the ratio of 150 grams of water per 100 grams of xylitol to facilitate infusion. Milk from the three cows was collected and analyzed prior to infusion (on day 0) and also was collected and analyzed on the third, seventh and fourteenth day of the test period. The results presented in Table 1 below for each milk component are averages for the milk collected from the three different cows on day 0 and a mean of the day 3, 7, and 14 concentration values, averaged over all of the test cows, for each particular milk component.

TABLE 1

|  | Fat (Wt %) | True Protein (Wt. %) | Lactose (Wt. %) | Total Solids (Wt. %) |
| --- | --- | --- | --- | --- |
| Day 0 | 3.32 | 2.76 | 4.65 | 11.43 |
| Mean of days 3, 7, and 14 | 3.63 | 2.86 | 4.66 | 11.82 |
| Difference (mean − day 0) | +0.31 | +0.10 | +0.01 | +0.39 |

These results demonstrate that abomasal infusion of xylitol caused a net increase in the weight percent of fat, true protein, lactose, and total solids in the milk produced by the abomasally infused cattle.

EXAMPLE 2

In this example, sorbitol was abomasally infused into three different cows at a rate of 100 grams of sorbitol per cow per day during a 14 day test period. The sorbitol rations were mixed with water to facilitate infusion. The rations provided to the cows during the period extending from day 0, prior to abomasal infusion of sorbitol, through day 14 of the test period were the same. The only difference in feeding of the cows between day 0 and days 1–14 of the test period were that during days 1–14 the cows were abomasally infused with the dosage of 100 grams of sorbitol per cow per day.

Milk from the three cows was collected and analyzed prior to infusion (on day 0) and also was collected and analyzed on the third, seventh and fourteenth day of the test period. The results presented in Table 2 below for each milk component for each particular day are averages for the milk collected from the three different cows.

TABLE 2

|  | Fat (Wt %) | True Protein (Wt. %) | Lactose (Wt. %) | Ash (Wt. %) | Total Solids (Wt. %) |
| --- | --- | --- | --- | --- | --- |
| Day 0 | 3.56 | 2.97 | 4.88 | 0.72 | 12.13 |
| Day 3 | 4.59 | 3.06 | 4.62 | 0.73 | 13.00 |
| Day 7 | 3.78 | 3.01 | 4.87 | 0.73 | 12.40 |
| Day 14 | 4.33 | 3.09 | 4.75 | 0.71 | 12.88 |
| Net Change | +0.67 | +0.08 | −0.13 | no net change | +0.63 |

The net change for the different milk components presented in Table 2 was calculated by averaging the results of days 3, 7 and 14 for a particular milk component and subtracting the results presented for day 0 for the particular milk component. These results demonstrate that abomasal infusion of sorbitol caused a net increase in the weight percent of fat, true protein, and total solids in the milk produced by the abomasally infused cattle.

Though there was a small net decrease in the concentration of lactose decreased during the test period, the primary cause of this decrease is believed to be either diminished feed ingestion or atypical digestive tract behavior of one of the three test cows proximate day three of the testing efforts, since a significant downward spike in lactose concentration occurred on day three that hampered full recovery of average lactose concentrations in the combined milk of the three test cows during the remaining eleven days of the testing.

Such diminished feed ingestion and atypical digestive tract behavior is sometimes encountered during dairy cattle trials and causes what is referred to in the dairy industry as ordinary "animal to animal" variations. Animal to animal variations occur, on average, in about five percent of the dairy cattle herd during trials and testing. Such animal to animal variations are believe to be caused by a variety of factors that are not directly controllable, such as reproductive system cycles, viruses and other illnesses, immune system variations, and random types of shock to the animal. Based on the foregoing explanation, the small net decrease in the concentration of lactose during the test period is not believed to be statistically significant, but is instead believed to be an anomaly attributable to ordinary animal to animal variations sometimes experienced during dairy cattle testing.

EXAMPLE 3

The trial of Example 2 was repeated in Example 3 several months later using three different cows. All of the test conditions described above for Example 2 were repeated in Example 3, with the exception of use of different cows. The results of the second trial are listed in Table 3 below:

TABLE 3

|  | Fat (Wt %) | True Protein (Wt. %) | Lactose (Wt. %) | Non-Protein Nitrogen (Wt. %) | Total Solids (Wt. %) |
| --- | --- | --- | --- | --- | --- |
| Day 0 | 3.47 | 3.14 | 4.85 | 0.24 | 12.18 |
| Day 3 | 4.22 | 3.21 | 4.80 | 0.23 | 12.95 |
| Day 7 | 3.53 | 2.89 | 5.12 | 0.27 | 12.26 |
| Day 14 | 3.81 | 3.22 | 5.80 | 0.23 | 12.55 |
| Net Change | +0.38 | −0.03 | +0.39 | no net change | +0.41 |

The net change for the different milk components presented in Table 3 was calculated by averaging the results of days 3, 7 and 14 for a particular milk component and subtracting the results presented for day 0 for the particular milk component. The results of Table 3 illustrate that, on average, the abomasal infusion of sorbitol caused a net increase in the amount of fat and total solids in the milk of the test cattle. Though the true protein concentration decreased very slightly during the test period, this is believed to be the result of animal to animal variations proximate day 7, since a significant downward spike in protein concentration occurred on day 7. Indeed, if the results of day 7 were eliminated from the calculation of the net change, the true protein content would have actually increased by about 0.08 weight percent due to abomasal infusion of sorbitol.

EXAMPLE 4

In this example, glycerol was abomasally infused into three different cows at a rate of 150 grams per cow per day during a 14 day test period. The rations provided to the cows during the period extending from day 0, prior to abomasal infusion of glycerol, through day 14 of the test period were the same. The only difference in feeding of the cows between day 0 and days 1–14 of the test period were that during days 1–14 the cows were abomasally infused with the dosage of 150 grams of glycerol per cow per day.

The glycerol was not combined with any other materials prior to being abomasally infused into the cattle. Milk from the three cows was collected and analyzed prior to infusion (on day 0) and also was collected and analyzed on the third, seventh and fourteenth day of the test period. The results presented in Table 4 below for each milk component for each particular day are averages for the milk collected from the three different cows.

TABLE 4

|  | Fat (Wt %) | True Protein (Wt. %) | Lactose (Wt. %) | Total Solids (Wt. %) |
| --- | --- | --- | --- | --- |
| Day 0 | 3.78 | 3.23 | 4.64 | 12.40 |
| Day 3 | 3.80 | 3.33 | 4.78 | 12.67 |
| Day 7 | 3.53 | 3.32 | 4.41 | 12.04 |
| Day 14 | 3.68 | 3.38 | 4.51 | 12.34 |
| Net Change | −0.11 | +0.11 | −0.07 | −0.05 |

The net change for the different milk components presented in Table 4 was calculated by averaging the results of days 3, 7 and 14 for a particular milk component and subtracting the results presented for day 0 for the particular milk component. These results demonstrate that abomasal infusion of glycerol caused a net increase in the weight percent of true protein in the milk produced by the abomasally infused cattle. This increase in true protein concentration is particularly significant considering that the test cattle were in the early lactation phase (less than 90 days into milk production) when abomasally infused with glycerol. Typically, when being fed ordinary rations, the concentration of true protein in milk produced by lactating cattle decreases as the early lactation phase progresses. Here, the abomasal glycerin infusion not only stabilized the normally expected decrease in true protein concentration, but also unexpectedly caused a net increase in true protein concentration.

These results also demonstrate that abomasal infusion of glycerol substantially stabilized the weight percent of fat in the milk produced by the abomasally infused cattle by permitting only a slight decrease in the fat concentration during the test period. This slight decrease in fat concentration is particularly significant considering that the test cattle were in the early lactation phase when abomasally infused with glycerol. Typically, when being fed ordinary rations, the concentration of fat in milk produced by lactating cattle decreases to a level about 3.4 weight percent to about 3.5 weight percent as the early lactation phase progresses. Here, the abomasal glycerin infusion prevented the normally expected drop in fat weight percent during the early lactation phase and instead unexpectedly substantially stabilized the fat concentration.

The decrease in the weight percent of lactose of only 0.07% is a negligible and is believed to be statistically insignificant. This is especially true since the data following start of the abomasal feeding regimen bobbled both above and below the pre-glycerol feeding level. These test results also demonstrate that abomasal infusion of glycerol substantially stabilized the weight percent of total solids in the milk produced by the abomasally infused cattle by permitting only a slight decrease in the total solids concentration during the test period. As with the true protein and fat results, this slight decrease in total solids concentration is particularly significant considering that the test cattle were in the early lactation phase when abomasally infused with glycerol. Since fat and true protein commonly constitute a little more than half by weight, of the total solids variable, the total solids concentration would ordinarily be expected to drop to a greater degree, during the early lactation phase, than the slight drop in total solids concentration exhibited during the abomasal glycerin infusion trial of this example.

EXAMPLE 5

In this example, glycerol was abomasally infused into three different cows at a rate of 150 grams per cow per day during a 14 day test period. The cows used in this Example were different from the cows used in Example 4. The rations provided to the cows during the period extending from day 0, prior to abomasal infusion of glycerol, through day 14 of the test period were the same. The only difference in feeding of the cows between day 0 and days 1–14 of the test period were that during days 1–14 the cows were abomasally infused with the dosage of 150 grams of glycerol per cow per day.

The glycerol was not combined with any other materials prior to being abomasally infused into the cattle. Milk from the three cows was collected and analyzed prior to infusion (on day 0) and also was collected and analyzed on the third, seventh and fourteenth day of the test period. The results presented in Table 5 below for each milk component for each particular day are averages for the milk collected from the three different cows.

TABLE 5

|  | Fat (Wt %) | True Protein (Wt. %) | Lactose (Wt. %) | Total Solids (Wt. %) |
| --- | --- | --- | --- | --- |
| Day 0 | 3.07 | 2.92 | 4.89 | 11.63 |
| Day 3 | 3.39 | 3.04 | 4.86 | 12.04 |
| Day 7 | 3.25 | 2.98 | 5.19 | 12.17 |
| Day 14 | 3.32 | 3.05 | 4.87 | 11.99 |
| Net Change | +0.25 | +0.10 | +0.08 | +0.44 |

The net change for the different milk components presented in Table 5 was calculated by averaging the results of days 3, 7 and 14 for a particular milk component and subtracting the results presented for day 0 for the particular milk component. These results demonstrate that abomasal infusion of glycerol caused a net increase in the weight percent of fat, true protein, lactose, and total solids in the milk produced by the abomasally infused cattle.

EXAMPLE 6

In Example 6, two cows were abomasally infused at the rate of 150 grams per cow per day of glycerol on an on-off-on schedule to determine whether there were any benefits to intermittently providing glycerol to the abomasum of the cattle. For each cow, glycerol was abomasally infused during weeks 1–3 and weeks 7–9, while water, and not glycerol, was abomasally infused into each cow during weeks 4–6. The results of this test are graphically depicted in FIG. 3 as the concentration, expressed as weight percent, of total solids in the milk produced by the cattle during the test period. These results of FIG. 3 demonstrate that, on average for the two test cows, the weight percent of total solids in the milk produced by the test cows increased during the on-off-on test period.

EXAMPLE 7

In this example, ten cows were orally fed 100 grams per cow per day of sorbitol along with their other daily rations during a test period of four weeks, while ten different cows of a control group were orally fed the same daily rations as the ten cows, with the exception that the ten cows of this control group were not given any sorbitol. The milk of the cows in the control group and the milk of the cows given sorbitol was sampled twice per week during the four week test period. Therefore, the values presented in Table 6 below for the various milk components for the control group and for the cows fed sorbitol represent averages of eight milk samples during the test period.

TABLE 6

|  | Fat (Wt %) | True Protein (Wt. %) | Lactose (Wt. %) | Total Solids (Wt. %) |
| --- | --- | --- | --- | --- |
| Control Group (no sorbitol) | 3.91 | 2.86 | 4.92 | 12.28 |
| Test Group (100 gr/day sorbitol) | 4.02 | 2.76 | 4.81 | 12.11 |
| Probability Value (P) | 0.77 | 0.20 | 0.20 | 0.73 |

The probability value, P, that is presented in Table 6 for each of the different milk components is a measure of statistical probability that the differing values between the control cattle and the cattle fed sorbitol, for each respective milk component, can be explained by the difference between the control group not being fed sorbitol and the test group that was fed sorbitol. A P value of 0.10 means that 10 times out of 100 the results can be explained by factors other than the feeding or withholding of sorbitol. Likewise, for a P value of 0.77, such as in the case of the weight percent of fat, this means that 77 times out of 100, the difference in values between the control group and sorbitol fed group can be explained by factors other than the feeding or withholding of sorbitol.

Thus, the overall conclusion that may be drawn from the testing of this example, as documented by the data presented in Table 6, is that cows orally fed sorbitol showed no statistically significant increase in the weight percent of milk components, versus the control group cattle that were not orally fed sorbitol. This is true even though the fat weight percent as between the control and the sorbitol fed group increased very slightly, because this slight increase is most likely not due to feeding or withholding of sorbitol.

EXAMPLE 8

In Example 8, glycerol was periodically fed orally to several test cows. Period 1 lasted from week 1–3, Period 2 lasted from week 4–6, and Period 3 lasted from week 7–9, with week 0 being the start of the test period in which no glycerol was provided. The results presented in Table 7 below are averages for particular components for milk produced from each of the test animals.

TABLE 7

|  | Week 0 (Pre-Glycerol Feeding) | Period 1 (Fed Glycerol) | Period 2 (No Glycerol) | Period 3 (Fed Glycerol) |
| --- | --- | --- | --- | --- |
| Fat in Milk (wt %) | 3.24 | 3.06 | 3.17 | 3.22 |
| True Protein in Milk (wt %) | 2.55 | 2.64 | 2.71 | 2.69 |
| Lactose in Milk (wt %) | 4.98 | 4.97 | 4.93 | 4.80 |
| Total Solids in Milk (wt %) | 11.49 | 11.38 | 11.52 | 11.43 |

The results presented in Table 7 demonstrate that this cyclic oral feeding of glycerol to the cattle either causes no increase or essentially no increase in the fat, lactose, or total solids content of the milk during the test period. Though the percent of true protein appears to increase during the test period, this conclusion is suspect since the true protein content actually increased during the period when no glycerol was provided, versus the periods when glycerol was provided. Based upon this apparent increase when no glycerol was provided, it is believed that the week 0 pre-glycerol feeding value of 2.55 for true protein may be tainted by a variable, such as animal to animal variation, that is unrelated to the oral glycerol feeding program and that the week 0 pre-glycerol feeding value should instead have been closer to the period 2 no-glycerol value of 2.71.

Although the present invention has been described with reference to preferred embodiments, workers skilled in the art will recognize that changes may be made in form and detail without departing from the spirit and scope of the invention.

What is claimed is:

1. A method of enhancing milk component production in a ruminant, the method comprising:
   providing a feed that comprises sorbitol, xylitol or glycerol in an amount that enhances milk component production;
   protecting the sorbitol, xylitol or glycerol from significant alteration in the rumen of the ruminant;
   supplying the sorbitol, xylitol or glycerol to the abomasum of the ruminant; and
   orally feeding the feed to the ruminant.

2. The method of claim 1 wherein enhancing milk component production comprises enhancing the weight percent of true protein, the weight percent of fat, the weight percent of lactose, the weight percent of total solids, or any combination of these in milk produced by the ruminant.

3. The method of claim 1 wherein protecting the sorbitol from significant alteration in the rumen of the ruminant allows at least about 50 weight percent of the sorbitol that is orally ingested by the ruminant to arrive unaltered, as sorbitol, in the abomasum of the ruminant after passing through the rumen of the ruminant.

4. A method of feeding a ruminant, the method comprising:
   providing a feed the comprises sorbitol, xylitol or glycerol, or any combination thereof;
   protecting the sorbitol, glycerol, xylitol or any combination thereof from significant alteration in the rumen of the ruminant;
   supplying the sorbitol, glycerol, xylitol or any combination thereof to the abomasum of the ruminant, the sorbitol, glycerol, xylitol or any combination thereof in an amount effective to enhance milk component production by the ruminant; and
   orally feeding the feed to the ruminant.

5. The method of claim 4 wherein enhancing milk component production comprises enhancing the weight percent of true protein, the weight percent of fat, the weight percent of lactose, the weight percent of total solids, or any combination of these in milk produced by the ruminant.

6. The method of claim 4 wherein protecting the sorbitol from significant alteration in the rumen of the ruminant allows at least about 50 weight percent of the sorbitol that is orally ingested by the ruminant to arrive unaltered, as sorbitol, in the abomasum of the ruminant after passing through the rumen of the ruminant.

7. A method of enhancing milk component production in a ruminant, the method comprising:
   providing a feed that comprises sorbitol, glycerol, xylitol or any combination thereof;
   supplying the sorbitol, glycerol, xylitol or any combination thereof to the abomasum of the ruminant in an amount that supplies a nutritional effect to the ruminant, supplying the sorbitol, glycerol, xylitol or any combination thereof to the abomasum of the ruminant comprising:
   protecting the sorbitol, glycerol, xylitol or any combination thereof from significant alteration in the rumen of the ruminant; and
   orally feeding the feed to the ruminant.

8. The method of claim 7 wherein protecting sorbitol from significant alteration in the rumen of the ruminant allows at least about 50 weight percent of the sorbitol that is orally ingested by the ruminant to arrive unaltered, as sorbitol, in the abomasum of the ruminant after passing through the rumen of the ruminant.

9. The method of claim 7, the method further comprising protecting the sorbitol, glycerol, xylitol or any combination thereof from alteration in the rumen of the ruminant to a degree that allows at least about 75 weight percent of the sorbitol, glycerol, xylitol or any combination thereof, that is orally ingested by the ruminant to arrive unaltered, as sorbitol, glycerol, xylitol or any combination thereof, in the abomasum of the ruminant after passing through the rumen of the ruminant.

10. The method of claim 7, the method further comprising protecting the sorbitol, glycerol, xylitol or any combination thereof from alteration in the rumen of the ruminant to a degree that allows at least about 90 weight percent of the sorbitol, glycerol, xylitol or any combination thereof that is orally ingested by the ruminant to arrive unaltered, as sorbitol, glycerol, xylitol or any combination thereof, in the abomasum of the ruminant after passing through the rumen of the ruminant.

11. The method of claim 7 wherein enhancing milk component production includes enhancing the weight percent of true protein, the weight percent of fat, the weight percent of lactose, the weight percent of total solids, or any combination of these in milk produced by the ruminant.

12. The method of claim 7 wherein enhancing milk component production comprises enhancing the weight percent of true protein in milk produced by the ruminant.

13. The method of claim 7 wherein enhancing milk component production comprises enhancing the weight percent of fat in milk produced by the ruminant.

14. The method of claim 7 wherein enhancing milk component production comprises enhancing the weight percent of lactose in milk produced by the ruminant.

15. The method of claim 7 wherein enhancing milk component production comprises enhancing the weight percent of total solids in milk produced by the ruminant.

16. A method of enhancing milk component production in a ruminant, the method comprising:
   providing a feed that comprises sorbitol;
   supplying the sorbitol to the abomasum of the ruminant in an amount effective to enhance milk component production, supplying the sorbitol to the abomasum of the ruminant comprising:
   protecting the sorbitol from significant alteration in the rumen of the ruminant, wherein protecting the sorbitol from significant alteration in the rumen of the ruminant allows at least about 50 weight percent of the sorbitol that is orally ingested by the ruminant to arrive unaltered, as sorbitol, in the abomasum of the ruminant after passing through the rumen of the ruminant; and
   orally feeding the feed to the ruminant.

17. The method of claim 16, the method further comprising protecting the sorbitol from alteration in the rumen of the ruminant to a degree that allows at least about 75 weight percent of the sorbitol that is orally ingested by the ruminant to arrive unaltered, as sorbitol, in the abomasum of the ruminant after passing through the rumen of the ruminant.

18. The method of claim 16, the method further comprising protecting the sorbitol from alteration in the rumen of the ruminant to a degree that allows at least about 90 weight percent of the sorbitol that is orally ingested by the ruminant to arrive unaltered, as sorbitol, in the abomasum of the ruminant after passing through the rumen of the ruminant.

19. The method of claim 16 wherein enhancing milk component production comprises enhancing the weight percent of true protein, the weight percent of fat, the weight percent of lactose, the weight percent of total solids, or any combination of these in milk produced by the ruminant.

20. The method of claim 16 wherein enhancing milk component production comprises enhancing the weight percent of true protein in milk produced by the ruminant.

21. The method of claim 16 wherein enhancing milk component production comprises enhancing the weight percent of fat in milk produced by the ruminant.

22. The method of claim 16 wherein enhancing milk component production comprises enhancing the weight percent of lactose in milk produced by the ruminant.

23. The method of claim 16 wherein enhancing milk component production comprises enhancing the weight percent of total solids in milk produced by the ruminant.

24. A method of feeding a ruminant, the method comprising:
   providing a feed that comprises a sugar alcohol, the sugar alcohol being ruminally-protected and the sugar alcohol including sorbitol, glycerol, xylitol, or any of these in any combination; and
   supplying the sugar alcohol to the abomasum of the ruminant in an amount effective to enhance the weight percent of true protein in milk produced by the ruminant.

25. The method of claim 24 wherein supplying the sorbitol to the abomasum of the ruminant comprises orally feeding the sorbitol to the ruminant, the method further comprising protecting sorbitol from alteration in the rumen of the ruminant to a degree that allows at least about 50 weight percent of the sorbitol that is orally ingested by the ruminant to arrive unaltered, as sorbitol in the abomasum of the ruminant after passing through the rumen of the ruminant.

26. The method of claim 24 wherein supplying the sorbitol, glycerol, xylitol or any combination thereof to the abomasum of the ruminant comprises orally feeding the sorbitol, glycerol, xylitol or any combination thereof to the ruminant, the method further comprising protecting the sorbitol, glycerol, xylitol or any combination thereof from alteration in the rumen of the ruminant to a degree that allows at least about 75 weight percent of the sorbitol, glycerol, xylitol or any combination thereof that is orally ingested by the ruminant to arrive unaltered, as sorbitol, glycerol, xylitol or any combination thereof in the abomasum of the ruminant after passing through the rumen of the ruminant.

27. The method of claim 24 wherein supplying the sorbitol, glycerol, xylitol or any combination thereof to the abomasum of the ruminant comprises orally feeding the sorbitol, glycerol, xylitol or any combination thereof to the ruminant, the method further comprising protecting the sorbitol, glycerol, xylitol or any combination thereof from alteration in the rumen of the ruminant to a degree that allows at least about 90 weight percent of the sorbitol, glycerol, xylitol or any combination thereof that is orally ingested by the ruminant to arrive unaltered, as sorbitol, glycerol, xylitol or any combination thereof, in the abomasum of the ruminant after passing through the rumen of the ruminant.

28. A method of feeding a ruminant, the method comprising:
   providing a feed that comprises a sugar alcohol, the sugar alcohol being ruminally-protected and the sugar alcohol comprising sorbitol; and
   supplying the sugar alcohol to the abomasum of the ruminant in an amount effective to enhance the weight percent of true protein in milk produced by the ruminant.

29. The method of claim 28 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

30. The method of claim 28 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

31. The method of claim 28 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

32. A method of feeding a ruminant, the method comprising:
   providing a feed that comprises a sugar alcohol, the sugar alcohol being ruminally-protected and the sugar alcohol comprising glycerol; and
   supplying the sugar alcohol to the abomasum of the ruminant in an amount effective to enhance the weight percent of true protein in milk produced by the ruminant.

33. The method of claim 32 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

34. The method of claim 32 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

35. The method of claim 32 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

36. A method of feeding a ruminant, the method comprising:
   providing a feed that comprises a sugar alcohol, the sugar alcohol being ruminally-protected and the sugar alcohol comprising xylitol; and
   supplying the sugar alcohol to the abomasum of the ruminant, sugar alcohol effective to enhance the weight percent of lactose in milk produced by the ruminant.

37. The method of claim 36 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

38. The method of claim 36 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

39. The method of claim 36 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

40. A method of feeding a ruminant, the method comprising:
   providing a feed that comprises a sugar alcohol, the sugar alcohol being ruminally-protected and the sugar alcohol comprising sorbitol; and
   supplying the sugar alcohol to the abomasum of the ruminant, the sugar alcohol effective to enhance the weight percent of lactose in milk produced by the ruminant.

41. The method of claim 40 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

42. The method of claim 40 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

43. The method of claim 40 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

44. A method of feeding a ruminant, the method comprising:
   providing a feed that comprises a sugar alcohol, the sugar alcohol being ruminally-protected and the sugar alcohol comprising glycerol; and
   supplying the sugar alcohol to the abomasum of the ruminant, the sugar alcohol effective to enhance the weight percent of lactose in milk produced by the ruminant.

45. The method of claim 44 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

46. The method of claim 44 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

47. The method of claim 44 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

48. A method of feeding a ruminant, the method comprising:
   providing a feed that comprises a sugar alcohol, the sugar alcohol being ruminally-protected and the sugar alcohol comprising xylitol being ruminally-protected; and
   supplying the sugar alcohol to the abomasum of the ruminant, the sugar alcohol effective to enhance the weight percent of true protein in milk produced by the ruminant.

49. The method of claim 48 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

50. The method of claim 48 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

51. The method of claim 48 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

52. A method of feeding a ruminant, the method comprising:
providing a feed that comprises a sugar alcohol, the sugar alcohol being ruminally-protected and the sugar alcohol comprising sorbitol; and
supplying the sugar alcohol to the abomasum of the ruminant, the sugar alcohol effective to enhance the weight percent of fat in milk produced by the ruminant.

53. The method of claim 52 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

54. The method of claim 52 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

55. The method of claim 52 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

56. A method of feeding a ruminant, the method comprising:
providing a feed that comprises a sugar alcohol, the sugar alcohol being ruminally-protected and the sugar alcohol comprising glycerol; and
supplying the sugar alcohol to the abomasum of the ruminant, the sugar alcohol effective to enhance the weight percent of fat in milk produced by the ruminant.

57. The method of claim 56 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

58. The method of claim 56 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

59. The method of claim 56 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

60. A method of feeding a ruminant, the method comprising:
providing a feed that comprises a sugar alcohol, the sugar alcohol being ruminally-protected and the sugar alcohol comprising xylitol; and
supplying the sugar alcohol to the abomasum of the ruminant, the sugar alcohol effective to enhance the weight percent of total solids protein in milk produced by the ruminant.

61. The method of claim 4, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

62. The method of claim 4, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

63. The method of claim 60 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

64. The method of claim 60 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

65. The method of claim 60 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

66. A method of feeding a ruminant, the method comprising:
providing a feed that comprises a sugar alcohol, the sugar alcohol being ruminally-protected and the sugar alcohol comprising sorbitol; and
supplying the sugar alcohol to the abomasum of the ruminant, the sugar alcohol effective to enhance the weight percent of total solids in milk produced by the ruminant.

67. The method of claim 66 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

68. The method of claim 66 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

69. The method of claim 66 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

70. A method of feeding a ruminant, the method comprising:
providing a feed th at comprises a sugar alcohol, the sugar alcohol be ing ruminally-protected and the sugar alcohol comprising glycerol; and
supplying the sugar alcohol to the abomasum of the ruminant, the sugar alcohol effective to enhance the weight percent of total solids in milk produced by the ruminant.

71. The method of claim 70 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

72. The method of claim 70 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

73. The method of claim 70 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

74. A method of feeding a ruminant, the method comprising:
providing a feed that comprises a sugar alcohol, the sugar alcohol being ruminally-protected and the sugar alcohol comprising xylitol; and
supplying the sugar alcohol to the abomasum of the ruminant, the sugar alcohol effective to enhance the weight percent of true protein, lactose, fat, total solids, or any combination of any of these in milk produced by the ruminant.

75. The method of claim 74 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

76. The method of claim 74 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

77. The method of claim 74 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

78. A method of feeding a ruminant, the method comprising:
providing a feed that comprises a sugar alcohol, the sugar alcohol being ruminally-protected and the sugar alcohol comprising sorbitol; and
supplying the sugar alcohol to the abomasum of the ruminant, the sugar alcohol effective to enhance the weight percent of true protein, lactose fat, total solids, or any combination of any of these in milk produced by the ruminant.

79. The method of claim 78 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

80. The method of claim 78 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

81. The method of claim 78 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

82. The method of claim 78 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

83. The method of claim 78 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

84. The method of claim 78 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

85. A method of feeding a ruminant, the method comprising:
   providing a feed that comprises a sugar alcohol, the sugar alcohol being ruminally-protected and the sugar alcohol comprising glycerol; and
   supplying the sugar alcohol to the abomasum of the ruminant, the sugar alcohol effective to enhance the weight percent of true protein, lactose fat, total solids, or any combination of any of these in milk produced by the ruminant.

86. The method of claim 85 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

87. The method of claim 85 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

88. The method of claim 81 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, sugar alcohol, in the abomasum of the ruminant after passing through the rumen of the ruminant.

89. The method of claim 81 wherein supplying the sugar alcohol to the abomasum of the ruminant comprises orally feeding the sugar alcohol to the ruminant, the method further comprising protecting sugar alcohol from alteration in the rumen of the ruminant to a degree that allows at least about 50 weight percent of the sugar alcohol that is orally ingested by the ruminant to arrive unaltered, as sugar alcohol, in the abomasum of the ruminant after passing through the rumen of the ruminant.

90. The method of claim 85 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

91. The method of claim 85 wherein supplying the sugar alcohol to the abomasum of the ruminant comprises orally feeding the sugar alcohol to the ruminant, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

92. The method of claim 1, the method further comprising protecting the sugar alcohol from alteration in the rumen of the ruminant to a degree that allows at least about 75 weight percent of the sugar alcohol that is orally ingested by the ruminant to arrive unaltered, as sugar alcohol, in the abomasum of the ruminant after passing through the rumen of the ruminant.

93. The method of claim 1, the method further comprising protecting the sugar alcohol from alteration in the rumen of the ruminant to a degree that allows at least about 90 weight percent of the sugar alcohol that is orally ingested by the ruminant to arrive unaltered, as sugar alcohol, in the abomasum of the ruminant after passing through the rumen of the ruminant.

94. The method of claim 1 wherein enhancing milk component production comprises enhancing the weight percent of true protein in milk produced by the ruminant.

95. The method of claim 1 wherein enhancing milk component production comprises enhancing the weight percent of fat in milk produced by the ruminant.

96. The method of claim 1 wherein enhancing milk component production comprises enhancing the weight percent of lactose in milk produced by the ruminant.

97. The method of claim 1 wherein enhancing milk component production comprises enhancing the weight percent of total solids in milk produced by the ruminant.

* * * * *